(12) United States Patent
Qu et al.

(10) Patent No.: US 9,397,597 B2
(45) Date of Patent: Jul. 19, 2016

(54) SENSED MOTOR WINDING CURRENT ADAPTING BLANKING PERIOD BETWEEN MAX/MIN VALUES

(71) Applicant: TEXAS INSTRUMENTS INCORPORATED, Dallas, TX (US)

(72) Inventors: Wenchao Qu, Dallas, TX (US); Anuj Jain, Irving, TX (US); Ryan Paul Kehr, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 47 days.

(21) Appl. No.: 14/257,998

(22) Filed: Apr. 21, 2014

(65) Prior Publication Data

US 2015/0028790 A1 Jan. 29, 2015

Related U.S. Application Data

(60) Provisional application No. 61/859,610, filed on Jul. 29, 2013.

(51) Int. Cl.
*H02P 8/00* (2006.01)
*H02P 8/12* (2006.01)

(52) U.S. Cl.
CPC ...................... *H02P 8/12* (2013.01)

(58) Field of Classification Search
CPC ........... H02P 7/29; H02P 5/68; H02P 7/0094; H02P 7/0044; H02P 8/12; H02P 8/18; H02P 8/22; H02P 2007/0088; H02P 31/00; H02P 3/08; H02P 7/0066; H02P 7/285; H02P 8/08; H02M 2001/008; H02M 3/156
USPC .................... 318/139, 696, 587, 610, 400.04, 318/400.09, 400.21, 601; 388/811; 320/140; 363/123, 132
See application file for complete search history.

(56) References Cited

U.S. PATENT DOCUMENTS

| | | | | |
|---|---|---|---|---|
| 5,521,473 A * | 5/1996 | Mizuno | ................ | H02H 7/0851 160/293.1 |
| 5,654,840 A * | 8/1997 | Patton | .................. | G11B 5/5565 318/601 |
| 6,271,978 B1 * | 8/2001 | Block | .................... | G11B 5/012 360/46 |
| 6,788,088 B2 * | 9/2004 | Throngnumchai | ..... | H02M 1/32 324/126 |
| 6,806,675 B2 * | 10/2004 | Wang | ........................ | H02P 8/12 318/432 |
| 6,861,817 B2 * | 3/2005 | Pigott | ....................... | H02P 8/08 318/560 |
| 7,180,257 B1 * | 2/2007 | Schneider | ............. | H02P 7/0094 318/400.09 |
| 7,352,145 B2 * | 4/2008 | Moller | ...................... | H02P 5/68 318/254.1 |

(Continued)

*Primary Examiner* — Paul Ip
(74) *Attorney, Agent, or Firm* — Lawrence J. Bassuk; Frank D. Cimino

(57) ABSTRACT

Stepper motor winding current regulation methods and apparatus adapt a maximum blanking period to generate an adapted blanking period that is proportional to a currently-selected current regulation set-point. Sensed winding current feedback is ignored at a current regulation controller during the adapted blanking period or during a minimum blanking period, whichever longer, to avoid attempting to track noise imposed upon a sensed winding current feedback signal at an initiation of rapid current changes di/dt. Doing so may decrease ripple in the motor winding current waveform and reduce zero-crossing distortion by decreasing overshoot of the current regulation set-point by the sensed winding current.

12 Claims, 6 Drawing Sheets

(56) References Cited

U.S. PATENT DOCUMENTS

| Patent/Publication No. | Date | Inventor | Classification |
|---|---|---|---|
| 7,474,068 B2 * | 1/2009 | Moller | H02P 5/68 318/432 |
| 7,538,500 B2 * | 5/2009 | Moller | H02P 5/68 318/34 |
| 7,545,131 B1 * | 6/2009 | Alexander | H02M 3/156 323/275 |
| 7,589,487 B2 * | 9/2009 | Moller | H02P 5/68 318/112 |
| 7,755,343 B2 * | 7/2010 | Alexander | H02M 3/156 323/282 |
| 7,889,977 B2 * | 2/2011 | Strike | H02P 7/29 318/400.21 |
| 7,915,864 B2 * | 3/2011 | Alexander | H02M 3/156 320/140 |
| 8,400,798 B2 * | 3/2013 | Bagarelli | H02M 3/157 363/132 |
| 2003/0067280 A1 * | 4/2003 | Wang | H02P 8/12 318/685 |
| 2006/0044849 A1 * | 3/2006 | Siljestrom | H02M 7/5395 363/41 |
| 2007/0075656 A1 * | 4/2007 | Moller | H02P 5/68 318/77 |
| 2007/0075657 A1 * | 4/2007 | Moller | H02P 5/68 318/77 |
| 2007/0075660 A1 * | 4/2007 | Moller | H02P 5/68 318/400.04 |
| 2008/0272715 A1 * | 11/2008 | Moller | H02P 5/68 318/34 |
| 2009/0085643 A1 * | 4/2009 | Patel | H02H 9/025 327/393 |
| 2009/0154905 A1 * | 6/2009 | Strike | H02P 7/29 388/811 |
| 2009/0237056 A1 * | 9/2009 | Alexander | H02M 3/156 323/284 |
| 2010/0157635 A1 * | 6/2010 | Bagarelli | H02M 3/157 363/123 |
| 2010/0244802 A1 * | 9/2010 | Alexander | H02M 3/156 323/284 |
| 2011/0248653 A1 * | 10/2011 | Brotto | B25F 5/021 318/139 |
| 2013/0301755 A1 * | 11/2013 | Zoels | H03K 17/26 375/316 |

* cited by examiner

SENSED MOTOR WINDING CURRENT ADAPTING BLANKING PERIOD BETWEEN MAX/MIN VALUES

PRIORITY CLAIM

This application claims the benefit of priority under 35 U.S.C. §119(e) to U.S. Provisional Patent Application Ser. No. 61/859,610 titled "Winding Current Dependent Adaptive Blanking Time For Improved Stepper Motor Current Regulation," filed on Jul. 29, 2013 and incorporated herein by reference in its entirety.

TECHNICAL FIELD

Structures and methods described herein relate to electromagnetic current regulation in rotating machinery, including current regulation in a stepper motor winding.

BACKGROUND INFORMATION

In stepper motors, motor position is controlled by regulating electrical current in each motor winding. Different stepper motor designs may have different numbers of windings, with the current waveform in each winding leading or lagging current waveforms associated with the other windings. For purposes of this disclosure, current regulation in a single winding is referred to as an example of the current regulation in each winding.

The current waveform in a given motor winding is, in many modern implementations, shaped by an output of a digital-to-analog converter (DAC). As is well-known in the art, a DAC output waveform, when viewed with sufficient magnification, is formed in a stair-stepped shape. For each digital input code ("DAC code"), an ideal DAC maintains a corresponding analog output voltage level. For example, a series of adjacent input codes (e.g., 00000000, 00000001, 00000010, and 00000011 in the case of binary input codes) applied sequentially at a DAC input results in a stair-stepped output waveform shape with each step up of equivalent magnitude to the previous step up.

In the case of a stepper motor, each DAC input code results in a different mechanical rotational position of the stepper motor rotor. As such, any particular section of the waveform is stair-stepped upward for increasing currents and stair-stepped downward for decreasing currents. Micro-stepping resolution, the number of steps in an electrical 360 degree revolution, is limited by the accuracy with which each motor winding current level can be regulated during the constant current portion of each step. That is, once a DAC input code is applied and the winding current reaches a level corresponding to the top of the DAC step up or to the bottom of the DAC step down, that level of winding current is regulated to avoid any further mechanical rotation or vibration of the rotor until a different DAC input code is applied. Absent such regulation, factors such as supply voltage variations and changes in mechanical loads on the stepper motor may cause winding current to vary during the duration of the desired step.

Like many methods of electrical voltage and current regulation, stepper motor winding current regulation may be hysteresis-based. That is, the regulation method may allow the winding current to ramp up to a set-point level corresponding to an applied DAC code. The set-point level of winding current is referred to herein as "ITRIP." When a forward voltage is applied across the winding, winding current ramps up during a period referred to herein as the "t_ON" period. When the winding current reaches ITRIP, the regulation mechanism then either disallows active drive to the winding or reverses voltage polarity across the winding during a period referred to herein as the "t_OFF" period. During a first portion or all of the t_OFF period referred to herein as the "decay" period, the winding current ramps down toward zero. If the negatively-sloped winding current reaches zero, the regulation mechanism may maintain the winding current at zero for the duration of the t_OFF period until allowing another ramp up to ITRIP. The sum of the t_ON period and the t_OFF period is referred to herein as a PWM cycle.

It is noted that multiple PWM cycles may occur over the duration of any step associated with a given DAC input code. For example, a stepper motor controlling vertical paper positioning in an inkjet printer may move to a particular position and remain at that position for hundreds of milliseconds while the inkjet head moves across the sheet of paper horizontally or even for several seconds to allow ink to dry on the sheet of paper before ejecting the sheet. Several or many PWM current regulation cycles may occur during these periods while the same DAC input code is applied to or latched into the vertical positioning stepper motor to create a corresponding DAC analog output level.

FIG. 1 is a prior-art schematic diagram of a typical "H-bridge" switching apparatus 100 used to regulate stepper motor current. Four switches S1-S4 are sequenced by current regulation logic (not shown) to control current through the winding 110. The current paths 115, 120, and 125 and corresponding directions are indicated by the dashed lines. Feedback to the current regulation logic is provided by a voltage drop across a sense resistor 130 corresponding to current flowing along the paths 115 and 120.

FIG. 2 is a series of prior-art waveform diagrams illustrating various modes of operation of the H-bridge 100 associated with known methods of stepper motor current regulation. The graphs of FIG. 2 illustrate two decay modes implemented by various current regulation logic circuits in conjunction with the H-bridge 100. Each decay mode controls the rate of decay of the current waveform through the stepper motor winding as further described below. The top graph 210 illustrates a slow decay mode and the bottom graph 212 illustrates a fast decay mode. The motor winding current decay rate is controlled in an effort to control jitter in the overall current waveform, particularly at waveform peaks where the slope of the current waveform changes direction and at zero cross-over points where the waveform changes polarity.

Considering now FIG. 2 in light of FIG. 1, the regulation logic turns switches S1 and S2 to a conductive state to ramp up current along the path 115. Current flows along the path 115 through the winding 110 and through the sense resistor 130 during the t_ON period 215. This is shown in the ramp-up portion 217 of the graphs 210 and 212 of FIG. 2. A parasitic LC tank circuit 112 is formed by circuit traces and terminals associated with connection of the sense resistor 130 to the H-bridge 100. The surge of drive current along the path 115 creates an oscillatory voltage waveform in the parasitic tank circuit 112. The oscillatory voltage is approximately equal to (L*di/dt) and can reach a magnitude of several volts at large step-current portions of the winding current waveform before settling.

The oscillatory voltage waveform appears across the sense resistor 130 and is sensed by current regulation logic (not shown) as a large magnitude of noise imposed on the winding current magnitude feedback signal. Feedback from the sense resistor 130 may be ignored by the regulation logic during a fixed blanking period tBLANK 218 in order to avoid the erratic feedback caused by abrupt current changes in the winding 110 at the start of t_ON 215. The settling time of the oscillatory noise signal is proportional to the product of the parasitic inductance L and di/dt. Accordingly, tBLANK 218 is fixed with a sufficiently long period to avoid erratic feedback to the current regulation logic at a current step level associated with the peak of the motor winding current waveform.

Current ramp-up 217 may overshoot the ITRIP setpoint 219 associated with step current levels lower than the peak current. Overshoot occurs because motor winding current feedback information is being ignored during the period tBLANK 218 and the ramp-up 217 is thus unregulated and continues uncontrolled until the expiration of tBLANK 218. Such overshoot may result in larger-magnitude ripple as di/dt increases for higher-magnitude motor currents and as the magnitude of the current waveform increases toward peak or decreases from peak. The overshoot may represent a greater percentage of the t_ON time 215 as ITRIP regulation levels decrease for smaller winding current waveform steps. The latter problem may lead to zero-crossing distortion of the motor winding current waveform as the average level of winding current is regulated across multiple PWM cycles more as a function of the period tBLANK 218 than of the waveform DAC code selected ITRIP setpoint. Zero-crossing distortion causes the average level of winding current to be higher than ITRIP for positive motor winding current waveform excursions and lower than ITRIP for negative motor winding current waveform excursions. This problem may impose a lower limit on the magnitude of current that may be finely regulated and thus on the driver DAC step size and resolution.

The decay portion 220 of the slow decay waveform 210 corresponds to the current path 125 of FIG. 1, implemented by enabling switches S2 and S3 to a conductive state and disabling switches S1 and S4 of the H-bridge 100. Disabling switches S1 and S4 prevents motor drive voltage VM from being applied across the motor winding 110. Enabling switches S2 and S3 allows current flowing through the motor winding 110 to slowly dissipate through internal resistance associated with the current path 125, resulting in the slow decay current waveform 220. It is noted that current along the slow decay path 125 does not flow through either the sense resistor 130 or the parasitic LC tank circuit 112. Thus, current is not sensed in slow decay mode and no TBLANK period is necessary to avoid erratic feedback.

A potential problem exists with slow decay mode, particularly for smaller regulated currents. Energy stored in the inductance of the motor winding 110 may not dissipate completely and take the slow decay current waveform 220 to a sufficiently low level by the end of the t_OFF period and prior to the start of the next PWM cycle. This problem may impose a lower limit on the magnitude of current that may be finely regulated and thus on the driver DAC step size and resolution.

The decay portion 230 of the fast decay waveform 212 corresponds to the current path 120 of FIG. 1, implemented by enabling switches S3 and S4 to a conductive state and disabling switches S1 and S2 of the H-bridge 100. The latter configuration of switches reverses the polarity of voltage applied across the motor winding 110, causing the decay portion 230 of the fast decay current waveform 212 to rapidly decrease to zero. It is noted that the discharge rate di/dt of the motor winding 110 during the decay period associated with the decay waveform 230 is approximately equal to the charge rate associated with the t_ON period 215. And, the di/dt current path 120 includes the sense resistor 130 and the parasitic tank oscillator circuit 112. Therefor, the same problems as discussed above for the drive current phase through the path 115 may apply during the fast decay portion 230 of the waveform 212.

SUMMARY OF THE INVENTION

Figure 2:
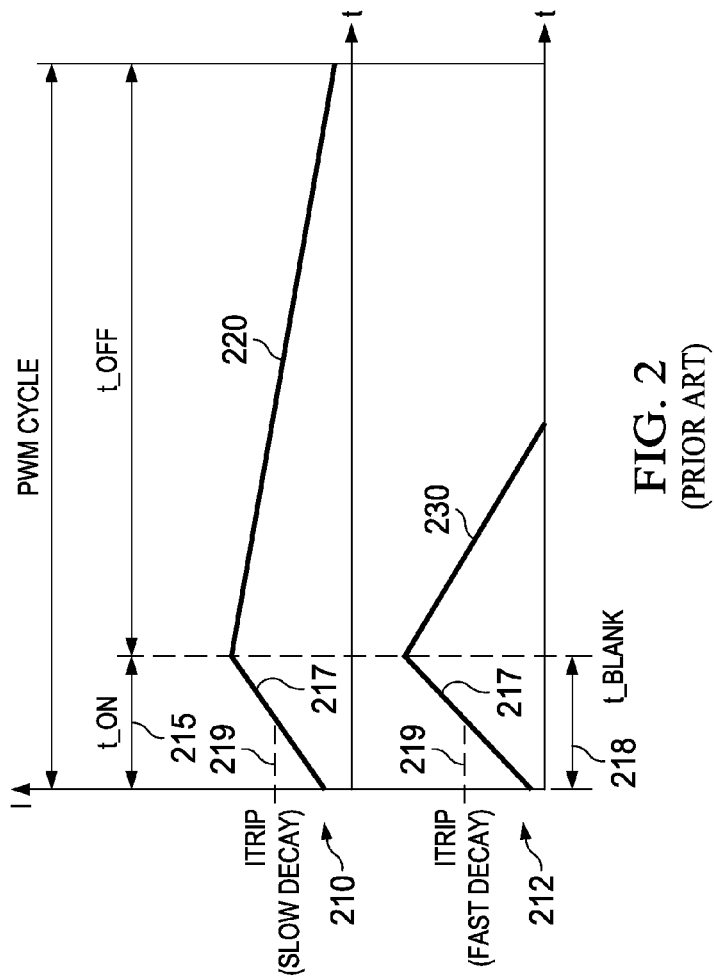
FIG. 2 is a series of prior-art waveform diagrams illustrating various modes of H-bridge operation associated with known methods of stepper motor current regulation.
Figure 1:
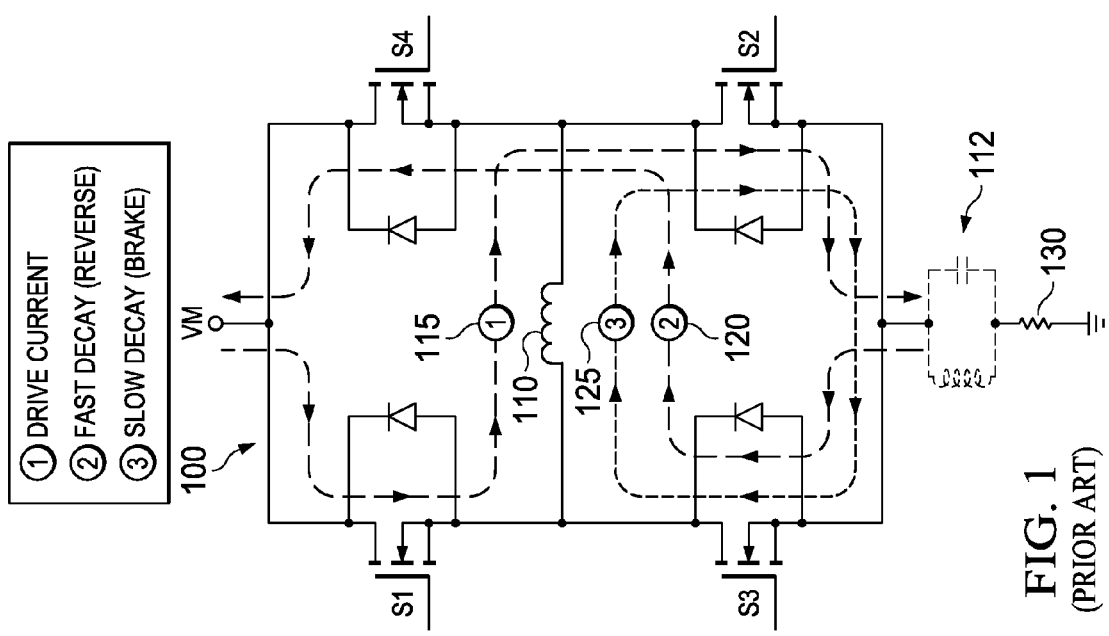
FIG. 1 is a prior-art schematic diagram illustrating a typical H-bridge switching apparatus used to regulate stepper motor current.

Apparatus and methods disclosed herein adapt a maximum blanking period MAX_BLANK to be proportional to a currently-selected current regulation set-point ITRIP. Doing so may decrease ripple in the motor winding current waveform, particularly at higher current steps toward the waveform peak and for higher current levels associated with higher-torque stepper motors. Ripple in the current waveform is decreased because the current regulation control logic, referred to herein as the PWM controller, is able to detect current sense feedback earlier following abrupt current changes in the motor windings. By adaptively adjusting the blanking period to a shorter time than MAX_BLANK, embodiments herein produce a winding current waveform displaying less average overshoot of the winding current past ITRIP while the PWM controller is "blind" to the sensed winding current level during blanking By reducing overshoot, disclosed embodiments and methods also reduce zero crossing distortion resulting from an "overshoot bias" that occurs when the average level of overshoot approaches small values of ITRIP close to the waveform zero crossing points as previously described.

Higher current levels result in a larger di/dt and a higher noise level on the winding current feedback signal(s) due to ringing caused by the parasitic RLC tank circuit associated with the sense resistor, as previously described. Absolute values of winding current at any step level on the winding current waveform may differ for different motor sizes and characteristics as determined by a torque DAC scaling factor. And, of course, the winding current differs between step levels of the winding current waveform as determined by the set-point output of the waveform DAC. Setting the blanking period too long increases overshoot. However, setting the blanking period too short results in unacceptable noise levels on the sensed winding current feedback signal and erratic current regulation at the beginning of large current changes with time di/dt. Consequently, embodiments herein factor a longest specified MAX_BLANK period based upon a peak magnitude of the winding current waveform scaled by the torque DAC scaling factor and by the ITRIP level associated with winding current step-level on the winding current waveform as determined by waveform DAC.

It is noted that regulation and blanking apparatus and methods described herein for a single example winding may apply to each of multiple windings in a stepper motor. Although current waveforms may be described and illustrated in examples herein as sinusoidal, some embodiments and methods may include storing wave shape characteristics and performing operations on wave shapes other than sinusoidal wave shapes. Regulation of the winding current to ITRIP including adaptive blanking period control may alleviate variations in the winding current caused by supply voltage variations, variations in mechanical loads on the stepper motor, etc. It is also noted that example embodiments may determine whether the slope of winding current is positive or negative by sensing the polarity of a voltage drop across a sense resistor. However, any apparatus and/or methods known in the art of sensing motor winding current magnitude and performing blanking operations are contemplated by this disclosure and are equally applicable to this disclosure.

Embodiments herein more precisely regulate winding current by controlling overshoot associated with periods of fast current rise and fast current decay during a PWM cycle through adaptive adjustment of blanking time as a function of levels of winding current. More accurate current regulation may permit a greater number of finer levels of micro-stepping and consequent higher resolution. Finer micro-stepping resolution may in turn enable more precise and smoother operation of robotics including medical surgical robotic mechanisms, medical pumps, security cameras, stage lightening, cash machines etc.

DETAILED DESCRIPTION

Figure 3:
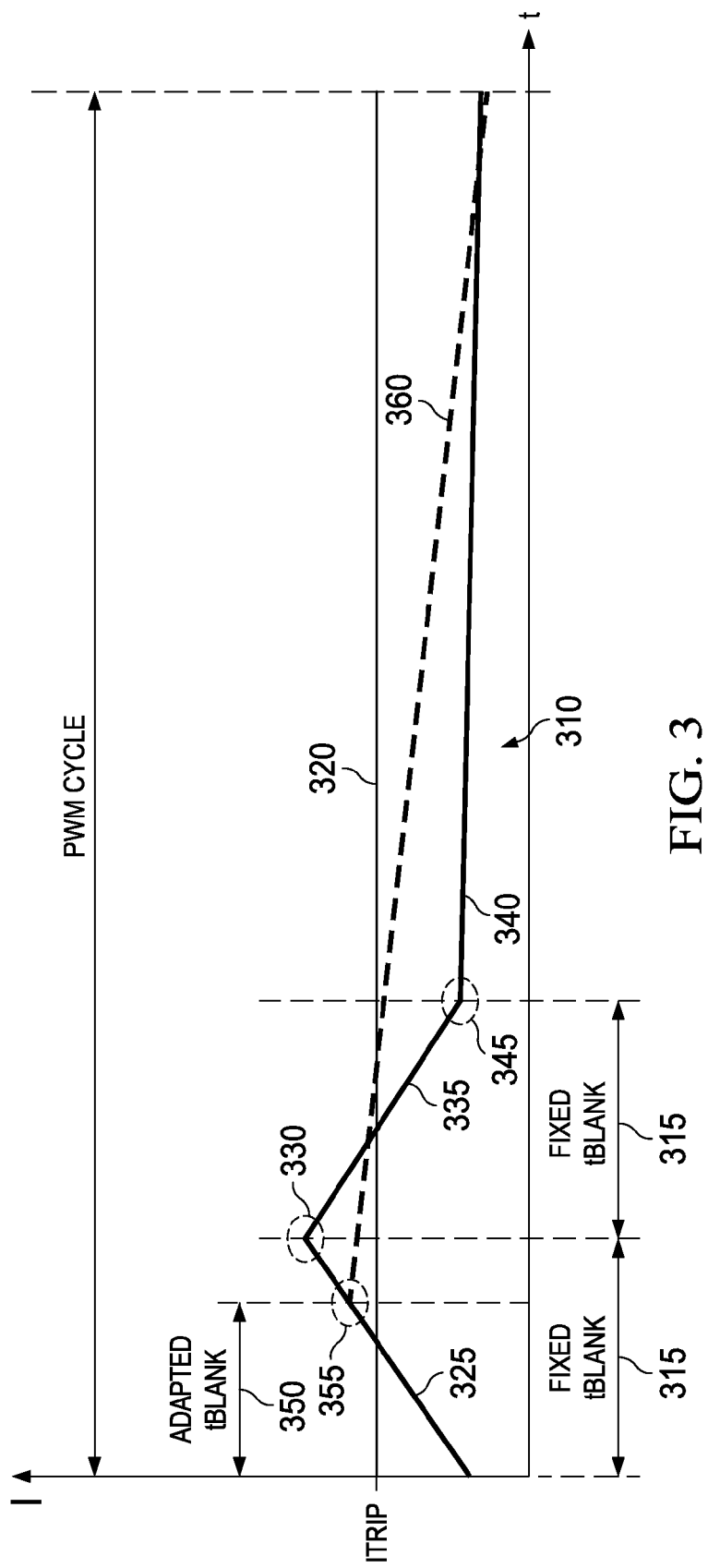
FIG. 3 is a waveform diagram comparing a stepper motor winding current waveform resulting from fixed blanking periods to a winding current waveform resulting from a winding current level adapted blanking period according to various example activities and embodiments of the invention.

FIG. 3 is a waveform diagram 310 comparing a stepper motor winding current waveform 340 resulting from fixed blanking periods 315 to a winding current waveform 360 resulting from a winding current level adapted blanking period 350 according to various example activities and embodiments of the invention. The drive current ramp-up 325 of the fixed blanking waveform 340 overshoots the ITRIP level 320 until the end 330 of the fixed blanking period 315. The overshoot occurs because during the fixed blanking period 315 the PWM controller ignores sensed current feedback signals that would indicate the point at which the drive current ramp 325 crosses ITRIP 320. Finally, at the end 330 of the fixed blanking period 315, the PWM controller acts upon the sensed current feedback signals by terminating the overshooting drive current and switching the H-bridge to fast decay mode.

The latter operation results in the fast decay portion 335 of the fixed blanking period waveform 340 during a second fixed blanking period 315. A similar problem occurs during the second fixed blanking period 315. The PWM controller ignores the sensed current feedback during the period 315, resulting in undershoot of the fast decay portion 335 of the fixed blanking period waveform 340 past the ITRIP level 320. Finally, at the end 345 of the second fixed blanking period 315, the PWM controller acts upon the winding current sensing feedback and places the H-bridge into slow decay mode. It is noted that entering fast decay following the end 330 of the first fixed blanking period 315 and observing the second fixed blanking period 315 are merely examples used to illustrate the limitations of fixed blanking Some PWM controllers may operate differently.

The waveform 360 illustrates PWM controller operation utilizing an adapted blanking period 350 according to embodiments and methods disclosed herein. As with fixed blanking, the PWM controller of this disclosure ignores winding current sense feedback until the end 355 of the adapted blanking period 350. However, the disclosed PWM controller terminates the drive ramp-up waveform 325 and enters slow decay at a magnitude much closer to the pre-established ITRIP level 320. Doing so decreases overshoot considerably during the illustrated PWM cycle. Over multiple PWM cycles associated with current regulation during any given step-current level of the winding current waveform, the structures and methods disclosed herein result in decreased ripple on that particular step-current level and a smoother overall waveform.

Another way to consider the problem associated with fixed blanking periods and the disclosed solution is that the duration of the fixed blanking period 315 is generally based upon the ITRIP level associated with the highest anticipated motor winding current. Doing so avoids worst-case noise on the winding current sense feedback signal associated with large current increases and decreases di/dt associated with the drive current portion 325 and the fast decay portion 335, respectively, of the fixed blanking period waveform 340. And, the magnitude of the overshoot/undershoot is a function of the duration of the fixed blanking period 315. Thus, the magnitude of the overshoot/undershoot as a percentage of the ITRIP level 320 increases as the ITRIP level 320 decreases. The ratio of the magnitude of overshoot/undershoot to ITRIP 320 becomes so large for small values of ITRIP 320 near the waveform zero crossing that zero crossing distortion occurs. By tying overshoot/undershoot to ITRIP 320, embodiments and methods herein cause this ratio to remain largely fixed. Decreased zero-crossing distortion results.

Figure 4:
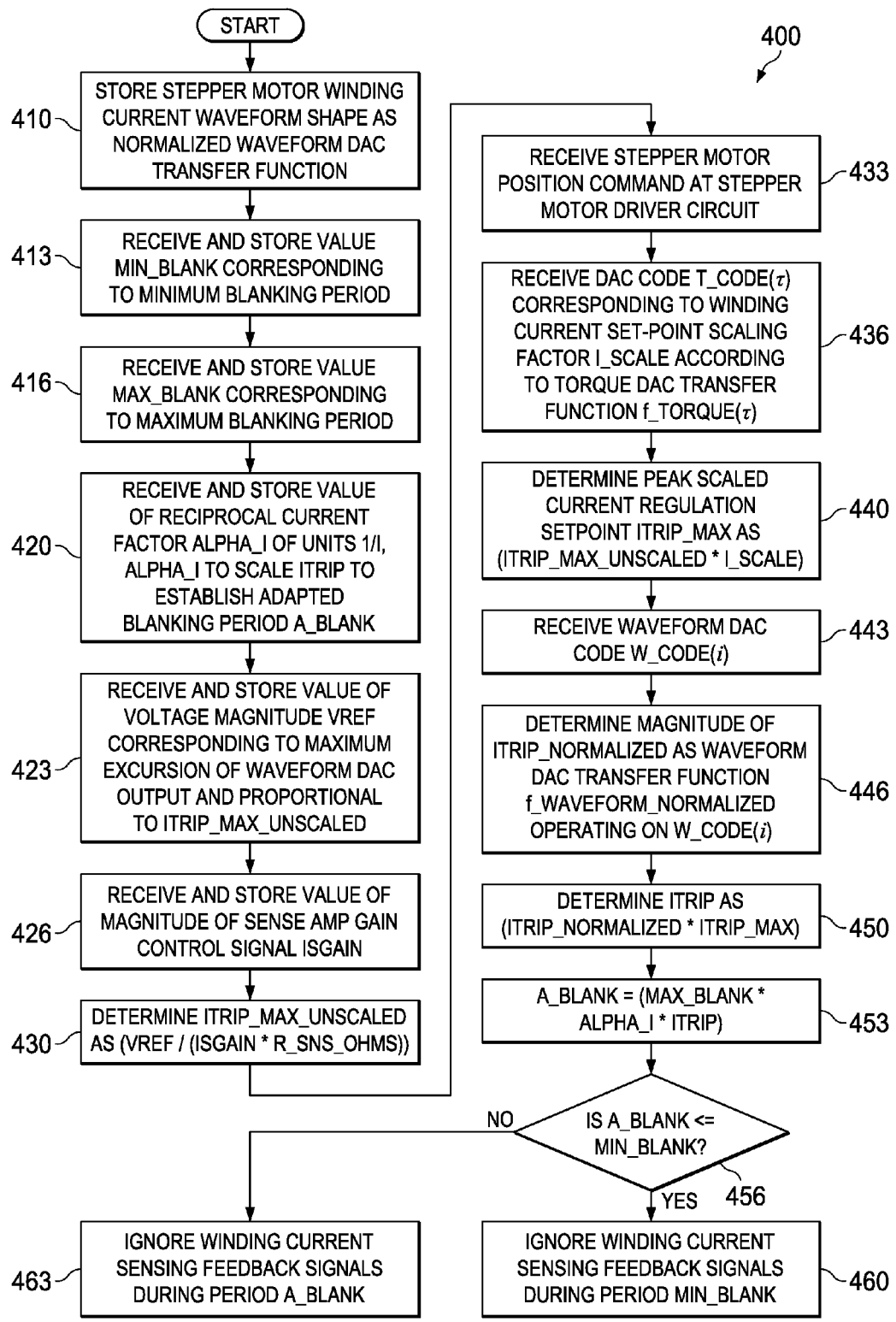
FIG. 4 is a flow diagram illustrating a method of adapted blanking associated with stepper motor winding current regulation according to various example activities.

FIG. 4 is a flow diagram illustrating a method 400 of adapted blanking associated with stepper motor winding current regulation according to various example activities. The method 400 establishes a blanking period for each ITRIP level of the winding current waveform based upon the absolute value of ITRIP as set by a waveform DAC, a torque DAC, and other circuit parameters as further described below. The method 400 thus includes receiving and/or storing values of said circuit parameters, some of which may be constant for a particular stepper motor design.

The method 400 commences at block 410 with storing a set of wave shape defining parameters associated with a winding current waveform DAC transfer function f_WAVEFORM_NORMALIZED in a PWM controller. ITRIP levels associated with a sinusoidal-shaped winding current waveform may be used to rotate a stepper motor. That is, the waveform DAC transfer function may produce a sinusoidal motor winding current when sequential DAC codes are presented to the waveform DAC at equally-spaced intervals to induce the stepper motor to rotate at a constant angular velocity. However, the method 400 is generalized to accommodate any shape of winding current waveform by storing f_WAVEFORM_NORMALIZED in the PWM controller. The wave shape defining parameters may be chosen from a group consisting of a trigonometric function, an exponential function, and an exponential order with a set of coefficients associated with an algebraic equation, etc.

The method 400 continues at block 413 with receiving and/or storing a value MIN_BLANK corresponding to a minimum blanking period. The method 400 also includes receiving a value MAX_BLANK corresponding to a maximum blanking period, at block 416. The method 400 further includes receiving and/or storing a value of a reciprocal current factor ALPHA_I of units 1/I, at block 420. ALPHA_I is used to scale a magnitude of the current regulation set-point ITRIP to establish an adapted blanking period A_BLANK as further described below.

The method 400 also includes receiving a value of a voltage magnitude VREF at the waveform DAC and at the PWM controller, at block 423. VREF corresponds to a maximum excursion of an analog output of the waveform DAC and is proportional to a peak un-scaled current regulation set-point ITRIP_MAX_UNSCALED. The method 400 further includes receiving a value representing a magnitude of a gain control signal ISGAIN used to scale a sense amplifier signal, at block 426. The sense amplifier signal represents a magnitude of a motor winding current flowing through a sense resistor R_SNS of value R_SNS_OHMS. The value representing ISGAIN is received at a motor winding current sense amplifier and is received and/or stored at the PWM controller. The method 400 continues at block 430 with determining ITRIP_MAX_UNSCALED as VREF divided by a product of ISGAIN and R_SNS_OHMS (VREF/(ISGAIN*R_SNS_OHMS)).

The method 400 continues at block 433 with receiving a stepper motor position command at a stepper motor driver circuit. The method 400 includes receiving a DAC code T_CODE($\tau$) at a torque DAC and at the PWM controller, at block 436. T_CODE($\tau$) corresponds to a winding current set-point scaling factor I_SCALE generated by the torque DAC in response to T_CODE($\tau$) according to a DAC transfer function f_TORQUE($\tau$). Some embodiments of the PWM controller further described below may use T_CODE($\tau$) to scale the winding current waveform produced by the waveform DAC to winding current levels appropriate to a particular stepper motor design. Accordingly, the method 400 includes determining a peak scaled current regulation set-point ITRIP_MAX as a product of ITRIP_MAX_UNSCALED and I_SCALE (ITRIP_MAX_UNSCALED*I_SCALE), at block 440.

The method 400 continues at block 443 with receiving a DAC code W_CODE(i) at a stepper motor winding current waveform DAC and at the PWM controller. The method 400 includes determining a magnitude of a normalized current regulation set-point ITRIP_NORMALIZED as function f_WAVEFORM_NORMALIZED of W_CODE(i), at block 446. The function f_WAVEFORM_NORMALIZED is a transfer function of the waveform DAC normalized to a peak magnitude of one (unity). The method 400 also includes determining the current regulation set-point ITRIP as a product of ITRIP_NORMALIZED and ITRIP_MAX (ITRIP_NORMALIZED*ITRIP_MAX), at block 450.

The method 400 further includes determining an adapted blanking time A_BLANK as a product of MAX_BLANK, ALPHA_I, and ITRIP (MAX_BLANK*ALPHA_I*ITRIP), at block 453.

The method 400 continues at block 456 with determining whether A_BLANK is less than or equal to MIN_BLANK. If A_BLANK is less than or equal to MIN_BLANK, the method 400 includes ignoring one or more sensed winding current feedback signals at the PWM controller during the minimum blanking period MIN_BLANK, at block 460. If A_BLANK is greater thank MIN_BLANK, the method 400 includes the sensed winding current feedback signals at the PWM controller during the adapted blanking period A_BLANK. The feedback signals are ignored during the blanking period MIN_BLANK or A_BLANK to avoid attempting to track noise imposed upon the sensed winding current feedback signal at an initiation of rapid current changes di/dt_large as previously described.

Figure 5:
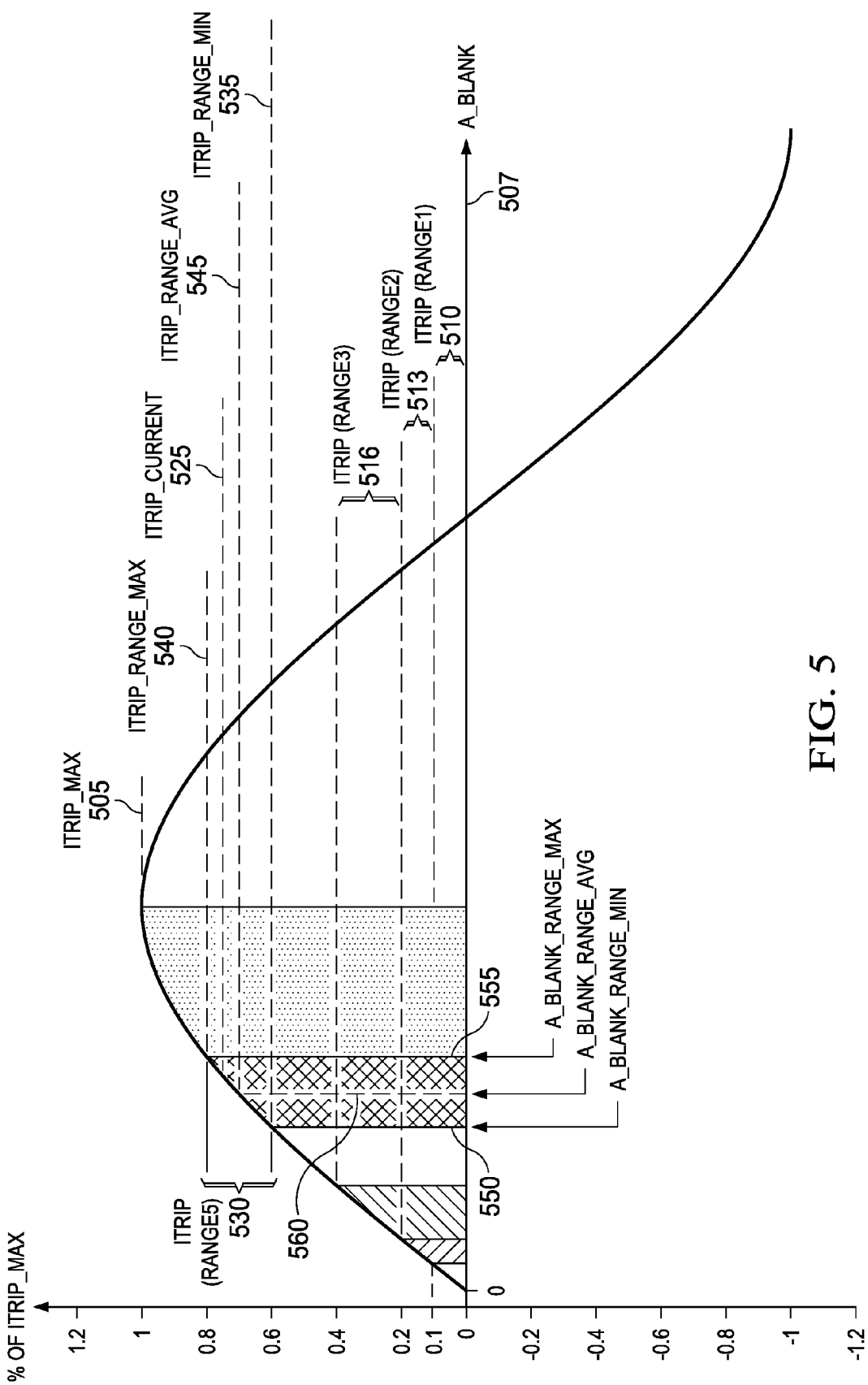
FIG. 5 is a waveform diagram illustrating a method of adapted blanking associated with stepper motor winding current regulation according to various example activities.

FIG. 5 is a waveform diagram illustrating a method 500 of adapted blanking associated with stepper motor winding current regulation according to various example activities. The method 500 is a less processor-intensive alternative to the method 400. Instead of determining blanking time as a function of the absolute magnitude of winding current for each set-point current step-level ITRIP, an appropriate blanking time is pre-determined for each of several ranges of winding current. Once ITRIP is determined, the blanking time associated with the range within which ITRIP falls is then looked up and used by the PWM controller.

The method 500 includes receiving parameter values MIN_BLANK, MAX_BLANK, VREF, ISGAIN, and T_CODE($\tau$) as defined and described above relative to the method 400. The method 500 also includes determining ITRIP_MAX_UNSCALED and the peak scaled current regulation setpoint ITRIP_MAX 505 as described above relative to the method 400.

The method 500 further includes dividing ITRIP_MAX 505 into a set of n ranges of winding current regulation set-points (e.g., the ranges ITRIP(range1) 510<I_TRIP(range 2) 513<ITRIP(range3) 516 . . . <ITRIP(rangen)). The method 500 includes selecting a magnitude of a motor winding current regulation set-point ITRIP_REPRESENTATIVE representing all values of ITRIP within a range 530 which includes the currently-selected ITRIP value 525. The currently-selected ITRIP value 525 is a function of the waveform DAC code W_CODE(i) and ITRIP_MAX 505 as described above for the method 400. Variations of the method 500 may determine ITRIP_REPRESENTATIVE as a highest magnitude value of ITRIP 540 within the range 530 which includes ITRIP 525, a lowest magnitude value of ITRIP 535 within the range 530, an average of a selected set of ITRIP values 545 within the range 530, etc.

The method 500 also includes receiving a value of a reciprocal current scaling factor ALPHA_I of units 1/I, ALPHA_I as previously described in relation to the method 400. The method 500 further includes determining an adapted blanking time A_BLANK as a product of MAX_BLANK, ALPHA_I, and ITRIP_REPRESENTATIVE. A_BLANK falls between a shortest blanking time A_BLANK_RANGE_MIN 550 associated with the ITRIP range 530 and a longest blanking time A_BLANK_RANGE_MAX 555 associated with the ITRIP range 530.

The method 500 includes utilizing the ITRIP range-determined value of blanking time by ignoring one or more sensed winding current feedback signals at the PWM controller during a blanking period of A_BLANK or MIN_BLANK, whichever is longer. Doing so may avoid attempting to track noise imposed upon the sensed winding current feedback signal at an initiation of rapid current changes di/dt_large.

Figure 6:
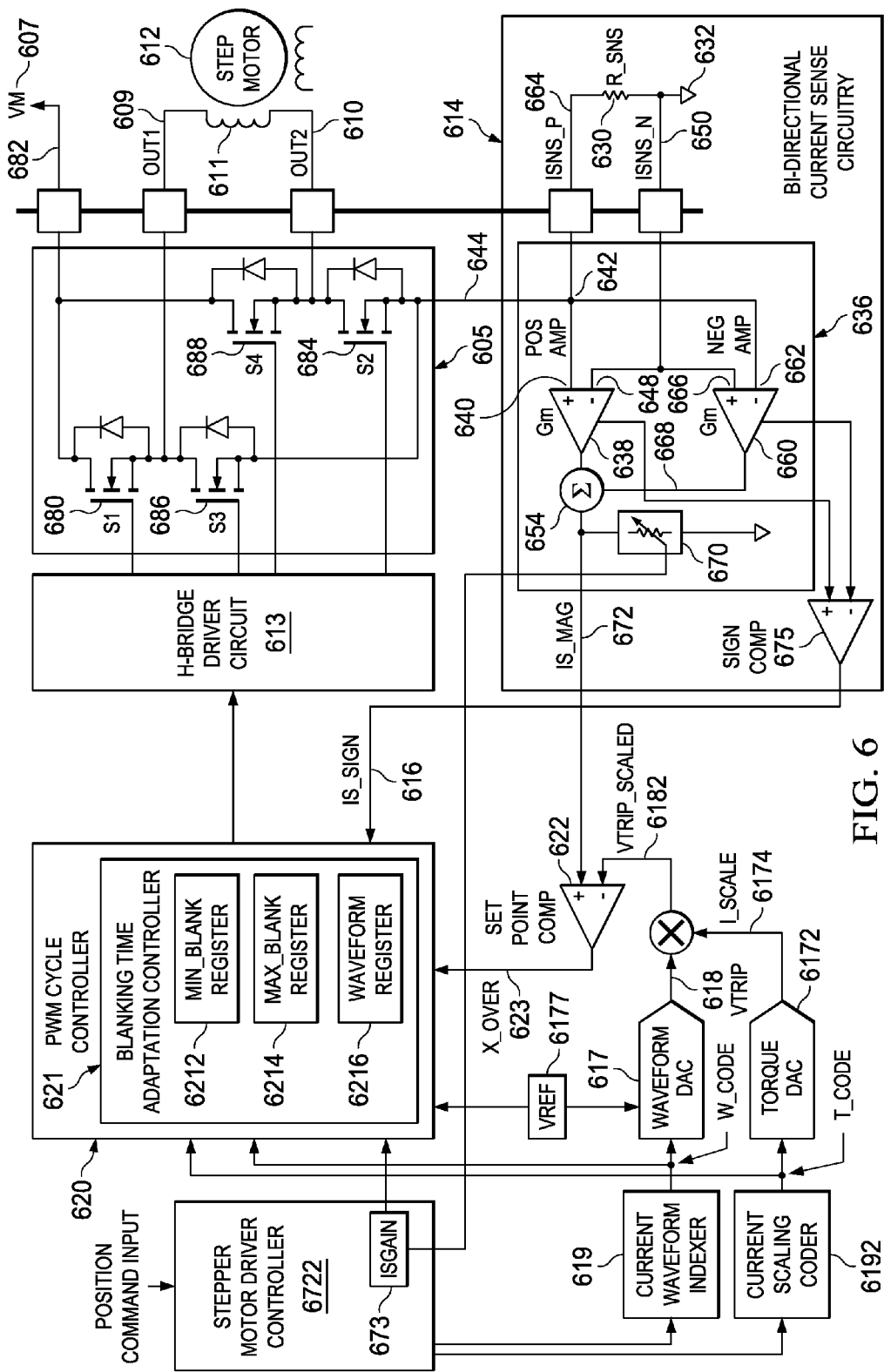
FIG. 6 is a schematic diagram illustrating a stepper motor current regulation apparatus according to various example embodiments of the invention.

FIG. 6 is a schematic diagram illustrating a stepper motor current regulation apparatus according to various example embodiments of the invention. The apparatus 600 is a closed-loop control apparatus and will be described generally in terms of current driving circuitry, current sensing circuitry, and current regulation circuitry including sensing feedback blanking logic. Individual components of the driving, sensing, and regulation, and blanking circuitry will then be enumerated in detail.

The stepper motor winding current regulation apparatus 600 includes an H-bridge 605. The H-bridge 605 controls a voltage source 607 at terminals 609 ("high side terminal") and 610 ("low side terminal") of a winding 611 of a stepper motor 612. The regulation apparatus 600 also includes a driver circuit 613 coupled to the H-bridge 605. The driver circuit 613 includes driver transistors to control switches associated with the H-bridge 605. The driver circuit 613 places switches of the H-bridge 605 in various configurations of conduction to control current flow through the winding 611 of the stepper motor 612 as further described below.

The apparatus 600 also includes a bi-directional current sensing circuit 614 coupled to the H-bridge 605. The current sensing circuit 614 senses a magnitude of current flowing in the winding 611 of the stepper motor 612. The current sensing circuit 614 also generates a control signal output level "IS_MAG" 672. IS_MAG 672 is proportional to the magnitude of the winding current as sensed by the current sensing circuit 614. The current sensing circuit also generates a digital polarity signal "IS_SIGN" 616. IS_SIGN 616 indicates whether the winding current is rising or falling.

The apparatus 600 further includes PWM cycle controller 620 coupled to the current sensing circuit 614. The PWM cycle controller 620 regulates the winding current as a function of one or more sensed winding current feedback signals. The PWM cycle controller 620 includes a blanking time adaptation controller portion 621. The adaptation cycle controller 621 establishes an adapted blanking period A_BLANK during which the sensed winding current feedback signal(s) are ignored at the PWM controller 621. Doing so avoids attempting to track noise imposed upon the sensed winding current feedback signal at an initiation of rapid current changes di/dt_large as described above.

The apparatus 600 also includes a MIN_BLANK register portion 6212 of the blanking time adaptation controller 621. The MIN_BLANK register 6212 stores a value MIN_BLANK corresponding to a minimum blanking time. The blanking time adaptation controller 621 also includes a MAX_BLANK register 6214. The MAX_BLANK register 6214 stores a value MAX_BLANK corresponding to a maximum blanking time. The blanking time adaptation controller 621 further includes a waveform register 6216. The waveform register 6216 stores a set of wave shape defining parameters associated with a waveform normalized to a peak value of one (unity) f_WAVEFORM_NORMALIZED.

The apparatus 600 also includes a stepper motor driver controller 6722 communicatively coupled to the current sensing circuit 614 and to the PWM cycle controller 620. The stepper motor driver controller 6722 sets a gain control value ISGAIN 673 at a sense amplifier 636 and indicates a magnitude of ISGAIN 673 to the PWM cycle controller 620.

The apparatus 600 further includes a waveform DAC 617 communicatively coupled to the bi-directional current sensing circuit 614 and to the PWM cycle controller 620. The waveform DAC 617 converts a code DAC W_CODE representing a magnitude of a winding current set-point ITRIP to an analog level VTRIP 618. A maximum level of VTRIP 618 is determined by a value of a voltage reference source VREF 6177 coupled to the waveform DAC 717 and to the PWM cycle controller 620. Some embodiments of the stepper motor winding current regulation apparatus 600 also include a current waveform indexer 619 coupled to the waveform DAC 617 and to the stepper motor driver controller 6722. The waveform indexer 619 generates a sequence of waveform DAC codes corresponding to a desired shape of a stepper motor winding current waveform associated with one or more stepper motor position commands.

The apparatus 600 further includes a set-point comparator 622 coupled to the PWM controller 620. The set-point comparator 622 compares a magnitude of VTRIP 618 to a magnitude of IS_MAG 672 and generate a digital output "X_OVER" 623. X_OVER 623 indicates whether the magnitude of IS_MAG 672 is greater than or less than the magnitude of VTRIP 618. A change in state of X_OVER 623 represents a time when the winding current waveform represented by IS_MAG 615 crosses over the winding current set-point level represented by VTRIP 618. The IS_SIGN 616 output of the current sensing circuit 614 indicates the sign of the slope of the sensed current waveform, as previously described. Together, X_OVER 623 and IS_SIGN 616 indicate the behavior of the sensed current waveform relative to the winding current set-point ITRIP.

The apparatus 600 also includes a torque DAC 6172 communicatively coupled to the set-point comparator 622. The torque DAC 6172 scales VTRIP 618 by a factor I_SCALE 6174 to produce a scaled value VTRIP_SCALED 6182. The torque DAC 6172 is used to scale the winding current waveform according to the current requirements of a particular stepper motor 612. The apparatus 600 also includes a current scaling coder 6192 coupled to the stepper motor driver controller 6722. The current scaling coder 6192 generates a torque DAC code T_CODE used to set I_SCALE 6174.

The bi-directional current sensing circuit 614 will now be described in further detail. The sensing circuit 614 includes a sense resistor 630 of R_SNS_OHMS. The sense resistor 630 is coupled in series with the winding 611 of the stepper motor 612 and is coupled to a ground rail 632 such that the winding current flows through the sense resistor 630. The current sensing circuit 614 also includes the sense amplifier 636 coupled to the sense resistor 630. The sense amplifier 636 senses a magnitude and a direction of the winding current flowing through the sense resistor 630. In some embodiments, the sense amplifier 636 senses the magnitude and direction of winding current as a magnitude and polarity of a voltage drop across the sense resistor 630.

In some embodiments, the sense amplifier 636 includes a first transconductance amplifier 638. A non-inverting input 640 of the first transconductance amplifier 638 is coupled to a junction 642 of a low-side output 644 of the H-bridge 605 and a non-grounded terminal 664 of the sense resistor 630. An inverting input 648 of the first transconductance amplifier 638 is coupled to a grounded terminal 650 of the sense resistor 630. An output of the first transconductance amplifier 638 is coupled to a current summing junction 654.

In some embodiments, the sense amplifier 636 also includes a second transconductance amplifier 660. An inverting input 662 of the second transconductance amplifier 660 is coupled to the junction 642 of the low-side output 644 of the H-bridge 605 and the non-grounded terminal 646 of the sense resistor 630. A non-inverting input 666 of the second transconductance amplifier 660 is coupled to the grounded terminal 650 of the sense resistor 630. An output 668 of the second transconductance amplifier 660 is coupled to the current summing junction 654. A variable sense amplifier gain control resistor 670 is coupled between an output 672 of the summing junction 654 and ground 632. Some embodiments of the sense amplifier 636 also include a gain control circuit 673 coupled to the gain control resistor 670. The gain control circuit 673 controls the gain of the sense amplifier 636 by adjusting a resistance value of the variable sense amplifier gain control resistor 670.

The bi-directional current sense circuit 614 also includes a sign comparator 675 coupled to the sense amplifier 636. The sign comparator 675 determines whether a first portion (e.g., the first transconductance amplifier 638 of the example embodiment) of the sense amplifier 636 is active, indicating a direction of current flow through the sense resistor 630 to ground 632. The sign comparator 675 also determines whether a second portion (e.g., the second transconductance amplifier 660 of the example embodiment) of the sense amplifier 636 is active, indicating a direction of current flow through the sense resistor 630 from ground 632. The sign comparator 675 generates the digital polarity signal "IS_SIGN" 616.

Turning back now to a more detailed explanation of the H-bridge 605, the H-bridge 605 includes a first switch 680 coupled between a positive voltage supply rail 682 and the high side terminal 609 of the winding 611 of the stepper motor 612. The H-bridge 605 also includes a second switch 684 coupled between the low side terminal 610 of the winding 611 and a first terminal 664 of the sense resistor 630. The first and second switches 680 and 684, respectively, are switched on to apply the voltage 607 across the winding 611. The voltage 607 is applied across the winding 611 with a polarity to cause current through the winding 611 to ramp up and induce a rotor component of the stepper motor 612 to rotate in a desired direction.

The H-bridge 605 also includes a third switch 686 coupled between the high side terminal 609 of the winding 611 and the first terminal 664 of the sense resistor 630. The second and third switches 684 and 686, respectively, are switched on to form a short circuit across the winding 811 to cause current through the winding 611 to slowly decay. The H-bridge 605 further includes a fourth switch 688 coupled between the positive voltage supply rail 682 and the low side terminal 610 of the winding 611. The third and fourth switches 686 and 688, respectively, are switched on and the first and second switches 680 and 684, respectively, are switched off to reverse the polarity of the voltage 607 applied across the winding 11. Doing so causes current through the winding 611 to rapidly decay.

Figure 7:
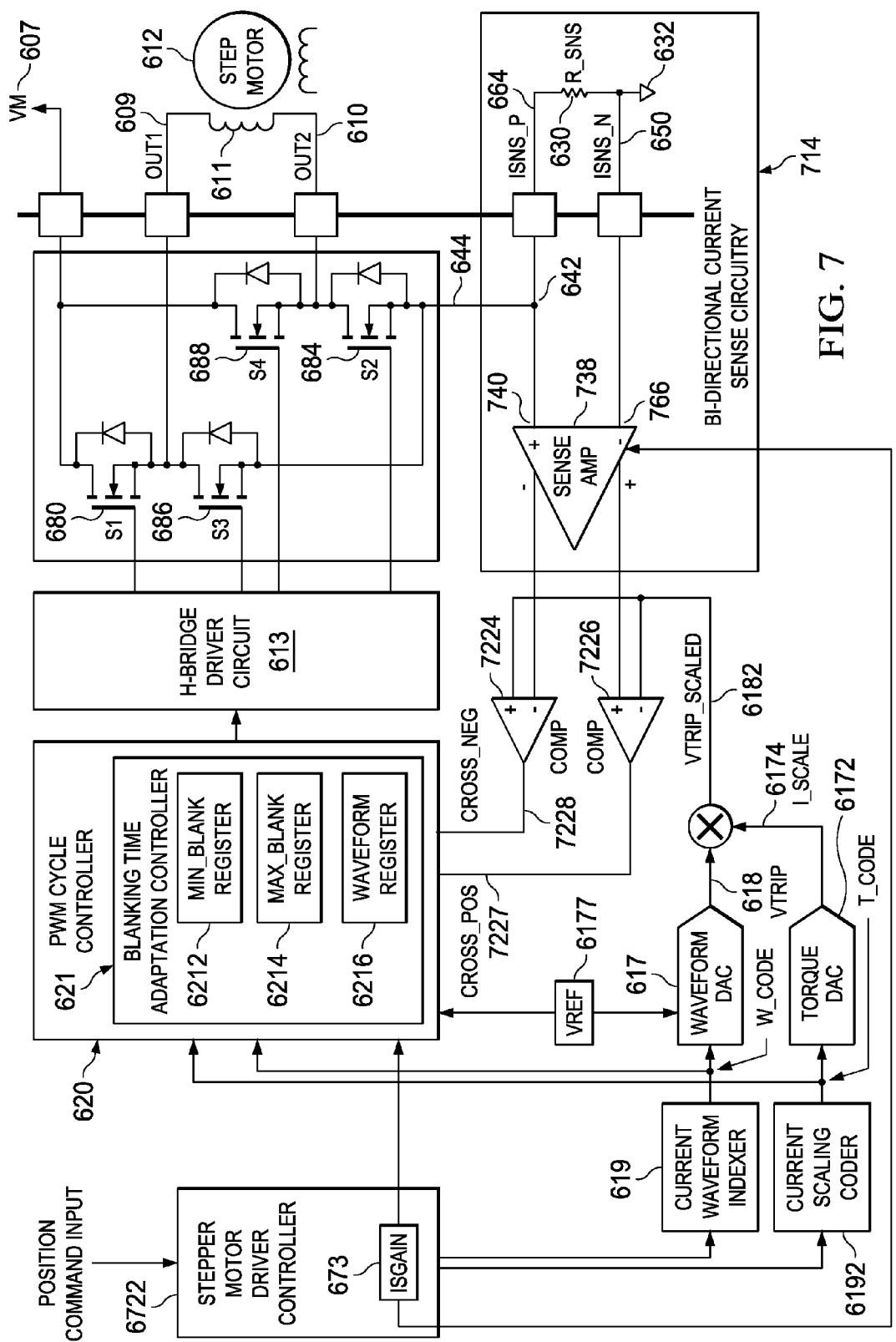
FIG. 7 is a schematic diagram illustrating a stepper motor current regulation apparatus according to various example embodiments of the invention.

FIG. 7 is a schematic diagram illustrating a stepper motor current regulation apparatus 700 according to various example embodiments of the invention. The current sense circuitry 614 described above with respect to FIG. 6 is not limited to details of the sense amplifier 636. The stepper motor current regulation apparatus 700 of FIG. 7 includes a differential output sense amplifier 738. The differential output sense amplifier 738 includes differential inputs 740 and 766. Each output of the differential output sense amplifier 738 drives a separate comparator 7226 and 7224, respectively. An output CROSS_POS 7227 of the comparator 7226 indicates that a positive-going winding current waveform has crossed the ITRIP threshold. An output CROSS_NEG 7228 of the comparator 7224 indicates that a negative-going winding current waveform has crossed the ITRIP threshold. The stepper motor current regulation apparatus 700 is identical to the stepper motor current regulation apparatus 600 described above in all other respects.

Methods and apparatus described herein may be useful in applications other than regulating a step current in a stepper motor winding. The methods 300 and 400 and the apparatus 600 and 700 are intended to provide a general understanding of the sequences of various methods and the structures of various embodiments. They are not intended to serve as complete descriptions of all elements and features of methods, apparatus and systems that might make use of these example sequences and structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems such as robotics, medical devices (e.g., heart monitor, blood pressure monitor, etc.), motor vehicles, televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), set top boxes, and others.

Methods and structures disclosed herein adapt a maximum blanking period to be proportional to a currently-selected current regulation set-point. Doing so may decrease ripple in the motor winding current waveform by decreasing overshoot of the current regulation set-point. Reducing overshoot also reduces zero-crossing distortion. More accurate current regulation may result, permitting a greater number of finer levels of micro-stepping and consequent higher resolution. Finer micro-stepping resolution may in turn enable more precise and smoother operation of robotics including medical surgical robotic mechanisms, medical pumps, security cameras, stage lightening, cash machines etc. and enable applications heretofore unreachable with the use of stepper motors.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A process of establishing an adapted blanking period in a pulse width modulated cycle providing current through a motor winding to a set point level of motor winding current ITRIP, comprising:

(a) storing a minimum blanking period value in a minimum register and a maximum blanking period value in a maximum register;
(b) passing a motor winding current through the motor winding and parasitic tank circuitry coupled to the motor winding, the parasitic tank circuitry including a sensing resistor;
(c) sensing a motor winding current through the resistor;
(d) determining in controller circuitry the adapted blanking period based on the sensed motor winding current;
(e) limiting the adapted blanking period to be between the minimum blanking period value and the maximum blanking period value; and
(f) blanking the sensing of the motor winding current during the adapted blanking period.

2. The process of claim 1 in which the passing includes passing the motor winding current through a stepper motor winding.

3. The process of claim 1 in which the determining includes determining the adapted blanking period as a function of an absolute value of sensed motor winding current for a set point level of motor winding current ITRIP.

4. The process of claim 1 in which the sensing includes sensing a motor winding current within one of certain ranges and the determining includes determining a certain adapted blanking period based on the one sensed motor winding current range.

5. The process of claim 1 in which the blanking includes avoiding noise imposed on the sensed motor winding current through the resistor from a rapid change in current through the tank circuit.

6. The process of claim 1 including effecting at least one of a slow decay and a fast decay of motor winding current after the blanking period.

7. The process of claim 1 in which the passing includes controlling the passing with a pulse width modulation cycle controller, containing the minimum register and the maximum register, coupled to the sense resistor and coupled through a driver circuit and an H-bridge circuit to the motor winding.

8. A motor circuit comprising:
(a) a motor winding having a first lead and a second lead;
(b) an H-bridge circuit coupling a voltage source to the first lead and a ground source to the second lead, and having bridge control inputs;
(c) a parasitic tank circuit coupled between the second lead and the ground source, the parasitic tank circuit including a sense resistor;
(d) a driver circuit having bridge control outputs coupled to the bridge control inputs and having a driver control input;
(e) current sense circuitry having sense leads coupled to the sense resistor and having current sense outputs, one of the current sense outputs carrying a signal indicating the motor winding current through the resistor;
(f) a waveform converter having a converter output;
(g) comparator circuitry having a first input coupled to the one current sense output, a second input coupled to the converter output, and a comparator output; and
(h) a pulse width modulation controller having a driver control output coupled to the driver control input, and control inputs including a sense input coupled to the comparator output, the modulation controller including a blanking time adaptation controller having a minimum blanking period value register and a maximum blanking period value register, the adaptation controller blanking a sensing of the comparator input during an adapted blanking period determined between values contained in the minimum blanking period value register and the maximum blanking period value register based on the control inputs.

9. The circuit of claim 8 including a torque converter having an output summed with the output of the waveform converter and coupled to the second input of the comparator circuitry.

10. The circuit of claim 8 in which the comparator circuitry includes a set point comparator having one first input coupled to the one current sense output, one second input coupled to the converter output, and one comparator output.

11. The circuit of claim 8 in which the current sense circuitry has another current sense output carrying a signal indicating the motor winding current through the resistor, and the comparator circuitry includes:
a first comparator having a non-inverting input coupled to the one current sense output, an inverting input coupled to the converter output, and a crossing negative output coupled to the modulation controller; and
a second comparator having a non-inverting input coupled to the another current sense output, an inverting input coupled to the converter output, and a crossing positive output coupled to the modulation controller.

12. The circuit of claim 11 including a torque converter having an output summed with the output of the waveform converter and coupled to the inverting inputs of the first and second comparators.

* * * * *